(12) United States Patent
Liu

(10) Patent No.: US 9,133,644 B1
(45) Date of Patent: Sep. 15, 2015

(54) EASY FOLD LAYOUT HUNTING BLIND FRAMEWORK STRUCTURE

(71) Applicant: Cheh-Kang Liu, Taipei (TW)

(72) Inventor: Cheh-Kang Liu, Taipei (TW)

(*) Notice: Subject to any disclaimer, the term of this patent is extended or adjusted under 35 U.S.C. 154(b) by 0 days.

(21) Appl. No.: 14/452,716

(22) Filed: Aug. 6, 2014

(51) Int. Cl.
*E04H 15/48* (2006.01)
*B63B 17/02* (2006.01)
*E04H 15/00* (2006.01)
*A01M 31/02* (2006.01)

(52) U.S. Cl.
CPC .............. *E04H 15/001* (2013.01); *B63B 17/02* (2013.01); *E04H 15/48* (2013.01); *A01M 31/025* (2013.01)

(58) Field of Classification Search
CPC ....... E04H 15/48; E04H 15/001; E04H 15/02; E04H 15/58; A01M 31/025; Y10S 135/901; B63B 17/02; B63B 19/14
USPC ................... 135/96, 143–144, 148–149, 151, 135/157–160, 116, 117, 901; 114/295, 351, 114/353, 361; 43/1–3
See application file for complete search history.

(56) References Cited

U.S. PATENT DOCUMENTS

| | | | | |
|---|---|---|---|---|
| 2,975,792 A * | 3/1961 | Herbert et al. | ................. | 135/153 |
| 4,106,145 A * | 8/1978 | Gillen et al. | .................. | 114/351 |
| 4,716,919 A * | 1/1988 | Griffin | ........................... | 135/133 |
| 4,751,936 A * | 6/1988 | Zibble et al. | ................... | 135/117 |
| 5,458,079 A * | 10/1995 | Matthews et al. | ............. | 114/351 |
| 5,887,539 A * | 3/1999 | Rex et al. | ....................... | 114/351 |
| 6,016,823 A * | 1/2000 | Hill | ................................. | 135/124 |
| 6,698,131 B2 * | 3/2004 | Latschaw | ............................ | 43/1 |
| 6,769,379 B2 * | 8/2004 | Foiles | ............................ | 114/351 |
| 7,063,035 B2 * | 6/2006 | Belcher | ........................ | 114/351 |
| 7,549,434 B2 * | 6/2009 | Bean | .............................. | 135/143 |
| 8,701,691 B2 * | 4/2014 | Hawk et al. | ................... | 135/143 |
| 8,936,036 B2 * | 1/2015 | Parsons | .......................... | 135/117 |

* cited by examiner

*Primary Examiner* — Winnie Yip
(74) *Attorney, Agent, or Firm* — Jackson IPG PLLC; Demian K. Jackson

(57) ABSTRACT

An easy fold layout hunting blind framework structure comprises a first and a second bottom frames, two side supporting frames, a front supporting frame, a rear supporting frame and two upper supporting frames. When folding to put away, two ends of the front and the rear supporting frames are respectively separated from the connection boxes provided at right and left sides of the two side supporting frames, then the two side supporting frames may turn towards the first and the second bottom frames to fold up, and further may fold in the right and left directions of the first and the second bottom frames. When developing, sequence of the operation can be carried out vice versa simply and easily without need for any hand tools. The size of the folded structure is so compact to carry or change the hunting sites.

3 Claims, 7 Drawing Sheets

EASY FOLD LAYOUT HUNTING BLIND FRAMEWORK STRUCTURE

BACKGROUND OF THE INVENTION

1. Field of the Invention

The present invention relates to an easy fold layout hunting blind framework structure which can be easily folded and developed for conveniently and rapidly usable in the hunting site.

2. Description of the Related Art

Referring to FIG. 1, this is a hunting blind on whose framework there is attached a camouflaged cloth structure formed of machine sewing or binder hook bound. Such a structure is so complicated to handle because it has to employ a number of screw bolts 901 to engage the structure parts by aiming at their precise positions when developing for use at site. In Case removing to a new hunting site or folding to put away in the customary place, the tedious procedure of detaching a number of screw bolts 901 one by one must be repeated for folding up the structure. Besides, the structure is bulky and inconvenient to transport.

Referring to US Publication No. 2013/0291916, a structure of hunting blind is disclosed whose two upper supporting frames do not necessary to lock, but instead, both upper supporting frames require to be positioned on the outer cover cloth. In this way, the structure is not easy to be built up and relieved from the outer cover cloth when detaching, therefore it is not easy to carry when changing the hunting sites. Moreover, the entire structure is bulky and inconvenient to put away.

SUMMARY OF THE INVENTION

In view of the foregoing situation, the inventor of the present invention herein conducted intensive research with all his minds and heart and finally came out with an easy fold layout hunting blind framework structure.

Accordingly, it is a main object of the present invention to provide an easy fold layout hunting blind framework structure which can be easily and rapidly folded and develop.

It is another object of the present invention to provide an easy fold layout hunting blind framework structure which can be folded or developed easily and simply without applying any hand tools or detaching instruments.

It is still another object of the present invention to provide an easy fold layout hunting blind framework structure which will be compact in size 3 after folding so as to be conveniently portable and removable to a new hunting site. Besides, it is convenient to put away and store for the user, and saving the production materials, easy for packing and transportation for the manufacturer.

It is one more object of the present invention to provide an easy fold layout hunting blind framework structure with a simple structure able to curtail the production cost.

DETAILED DESCRIPTION OF THE INVENTION

Figure 1:
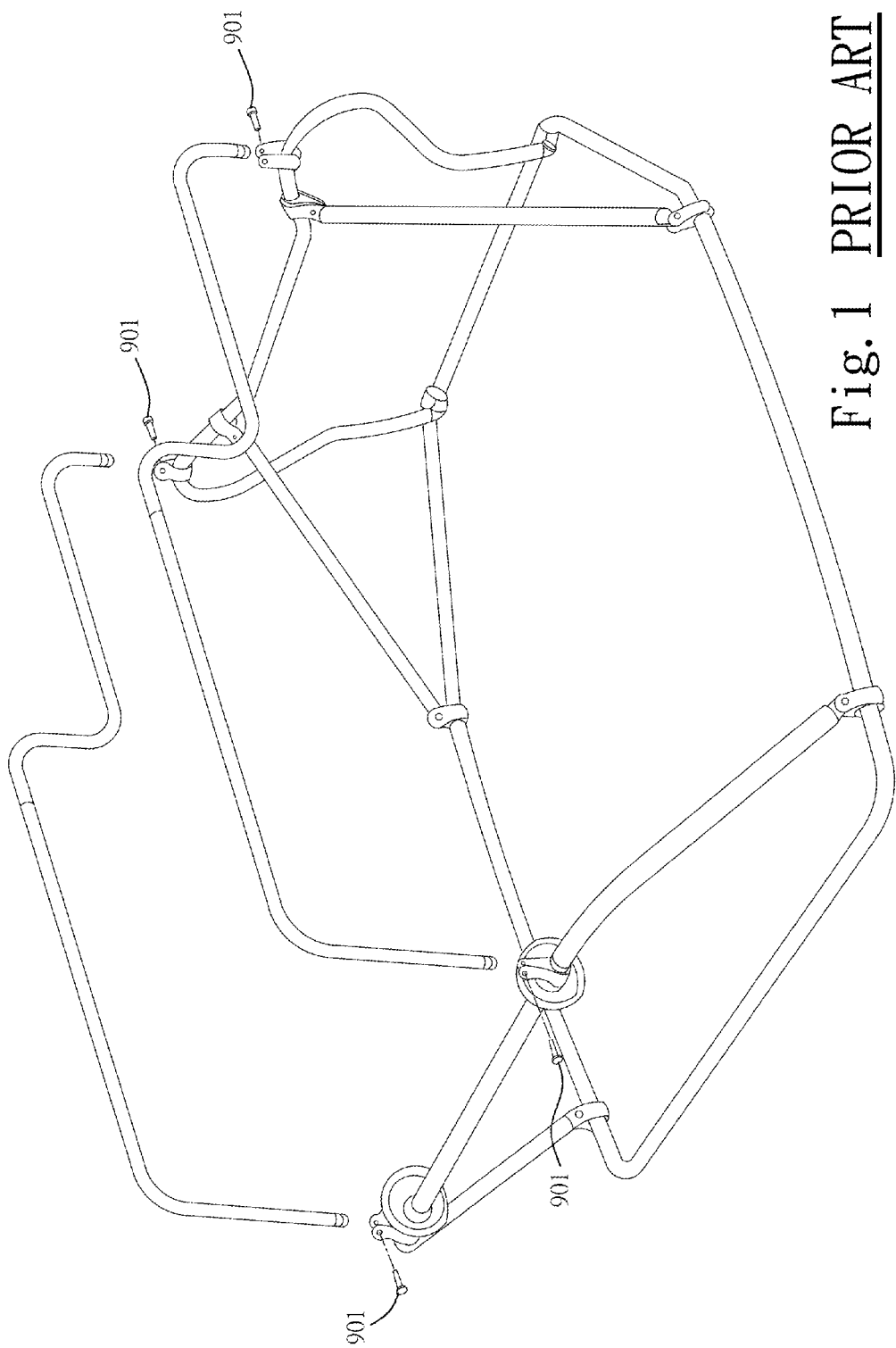
FIG. 1 a three dimensional view of a conventional hunting blind framework structure.
Figure 2:
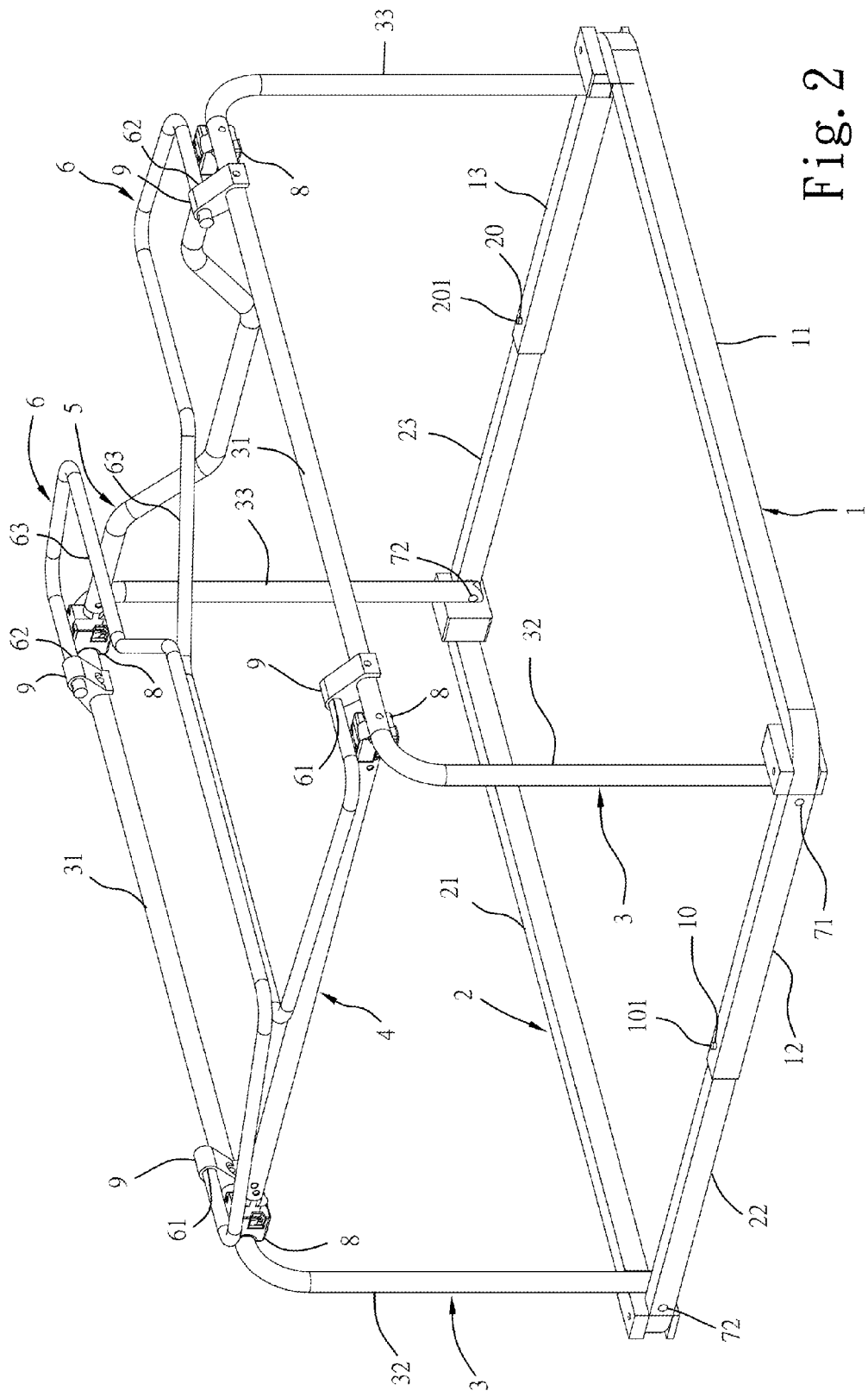
FIG. 2 is a three dimensional view of the structure according to an embodiment of the present invention.
Figure 3:
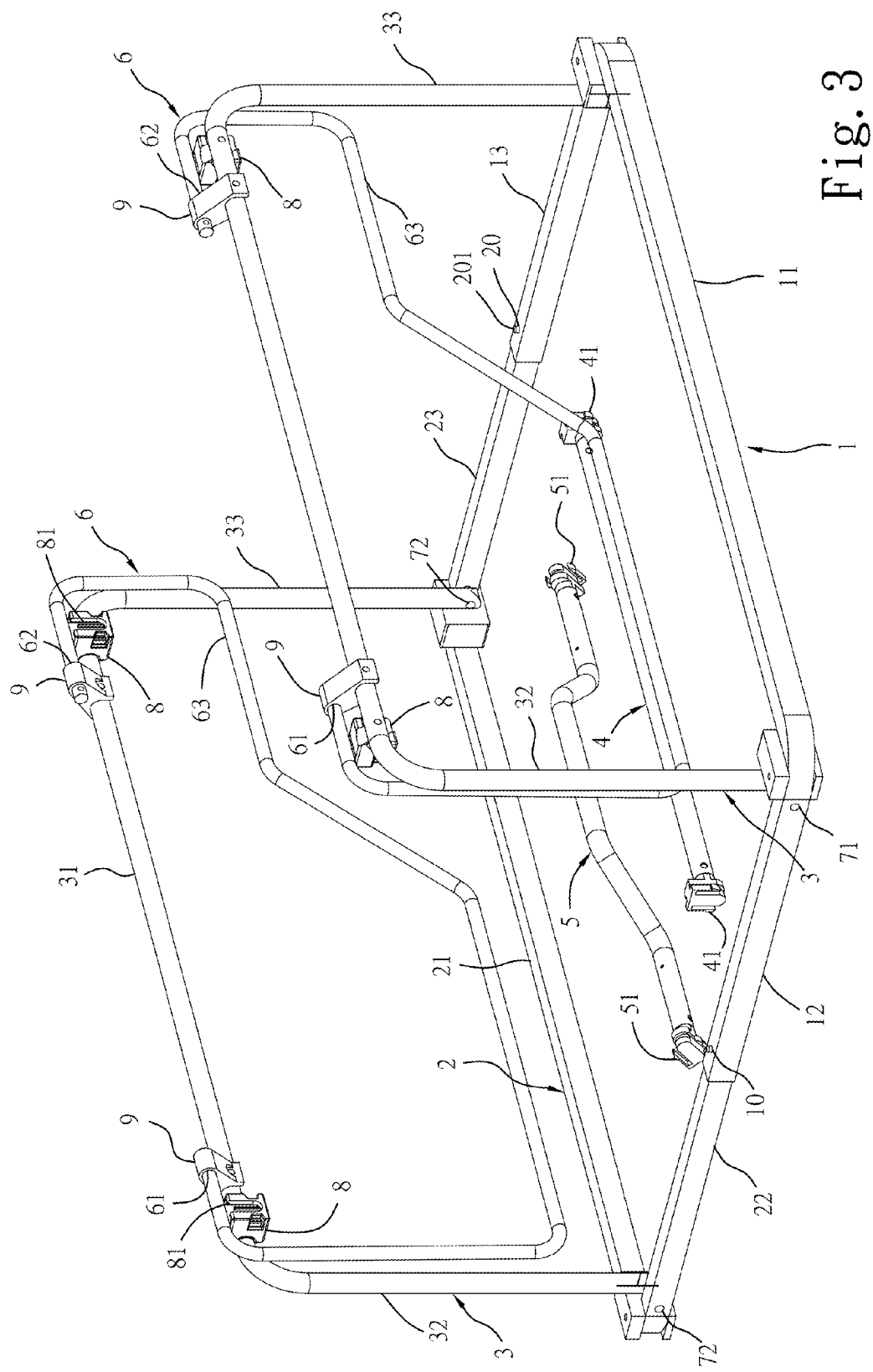
FIG. 3 is a three dimensional schematic view according to an embodiment of the present invention where the front and the rear supporting frames are detached.
Figure 4:
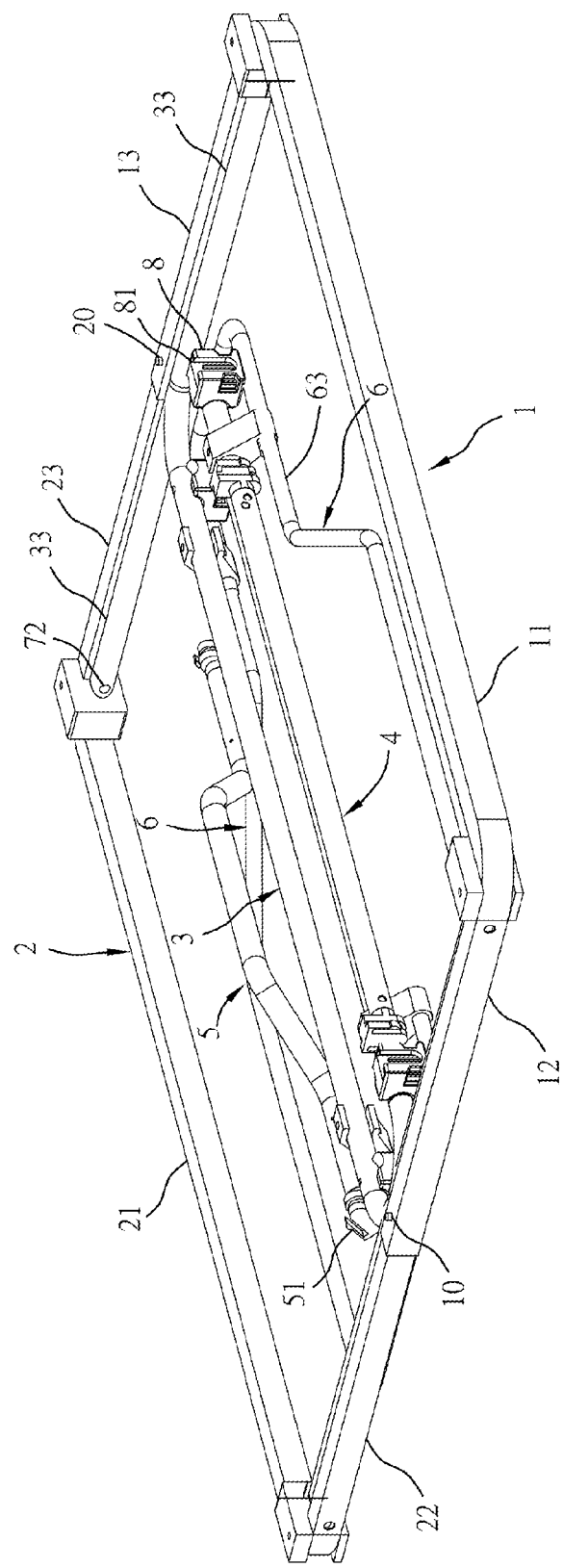
FIG. 4 is a three dimensional schematic view according to an embodiment of the present invention where the structure is in folded states.
Figure 5:
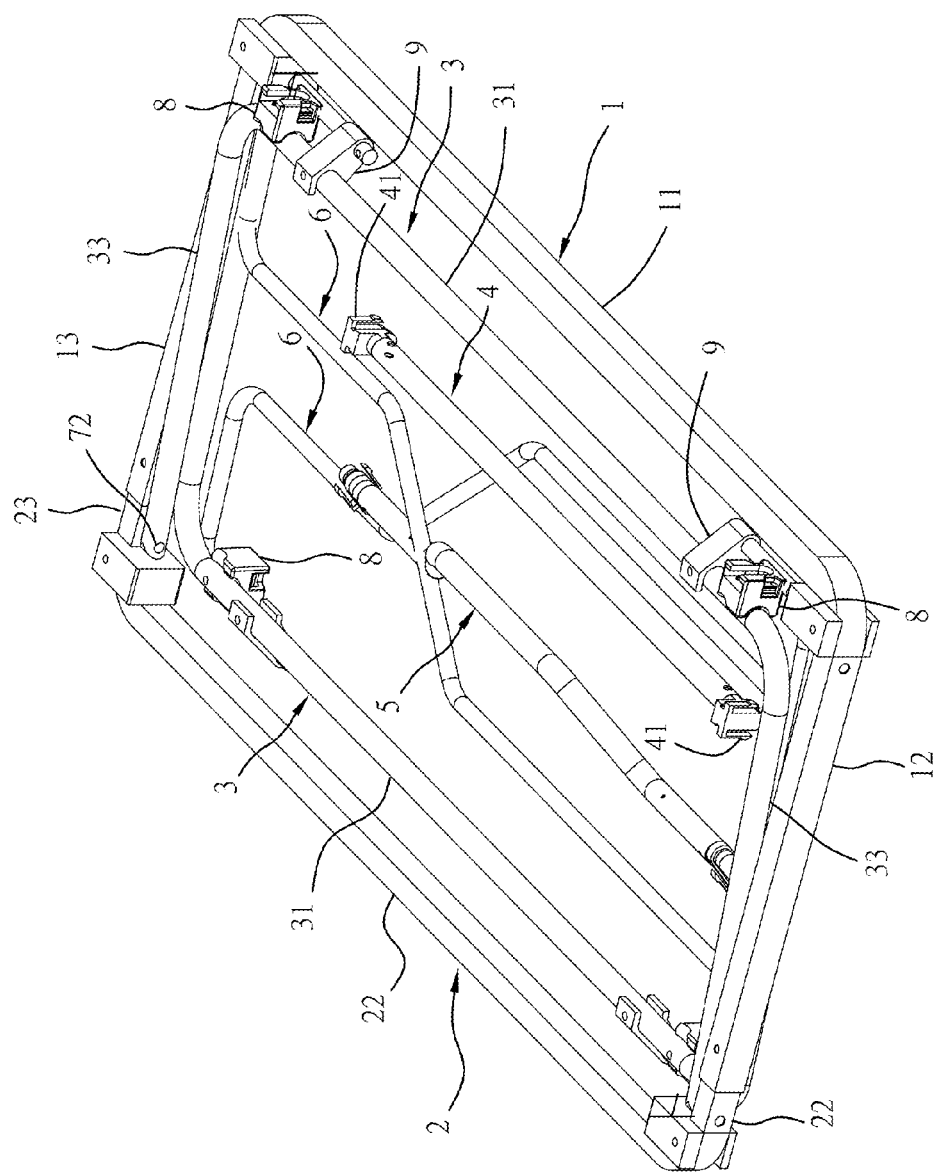
FIG. 5 is a three dimensional schematic view according to an embodiment of the present invention where the first and second bottom frames are further folded.
Figure 6:
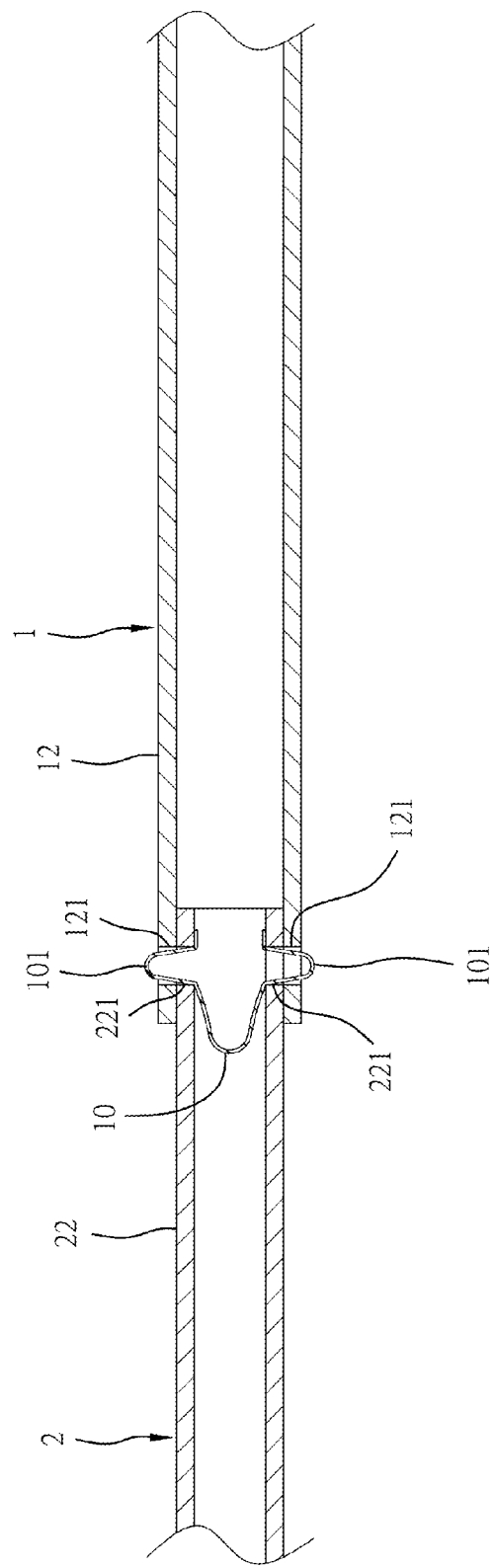
FIG. 6 is an enlarged partial sectional view showing the front bar of the first bottom frame and the front bar of the second bottom frame according to an embodiment of the present invention.
Figure 7:
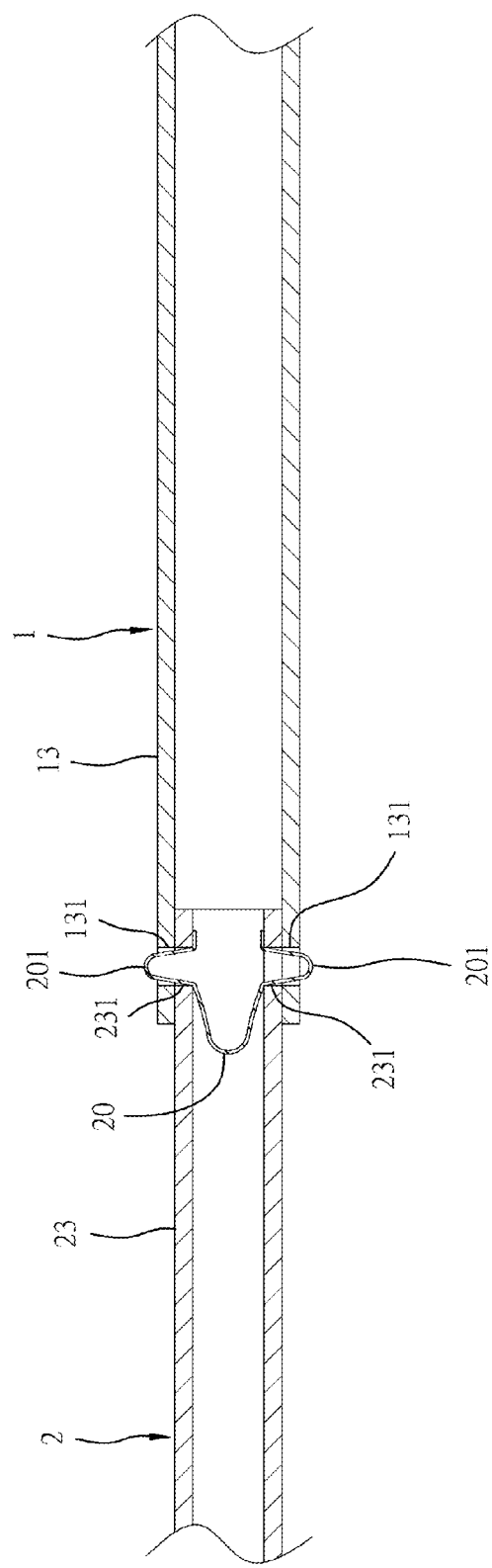
FIG. 7 is an enlarged partial sectional view showing the rear bar of the first bottom frame and the rear bar of the second bottom frame according to an embodiment of the present invention.

Referring to FIGS. 2-7, the easy fold layout hunting blind framework structure of the present invention is to be used for building up a camouflaged cloth structure for the duck hunter to hide.

The structure includes a first and a second bottom frames 1, 2 each has side bars 11, 21, and the front bars 12, 22 and rear bars 13, 23 respectively connected to front and rear sides of the side bars 11 and 21. The front bar 12 and the rear bar 13 of the first bottom frame 1 are respectively coupled with the corresponding front bar 22 and rear bar 23 of the second bottom frame 2, and fixed by positioning device 10, 20 (see FIGS. 6-7) at the position. The outer sides of the front bars 12, 22 and the rear bars 13, 23 of the first and the second bottom frames 1, 2 are respectively hinged to front and rear sides of two supporting frames 3 via a first shaft hinge 71 and second shaft hinge 72.

Each of the two side supporting frames 3 has an upper bar 31 and front and rear side standing bars 32, 33 connected to the upper bar 31. The lower ends of the standing bars 32, 33 are respectively hinged to the first and the second bottom frames 1, 2 via the first and the second shaft hinges 71, 72. A connection box 8 is provided at the front and rear sides of the upper bar 31 of the two side supporting frames 3 so as to connect the upper bars 31 with the front and rear supporting frames 4, 5 at their right and left sides. Besides, a front and a rear shaft hinges 9 are respectively provided at the front and rear sides of the upper bars 31 of the two side supporting frames 3 so as to make hinge connection respectively with the front and rear sides of two upper supporting frames 6.

A front supporting frame 4 is with its both ends, separably in connection with the connection bar 8 provided at the front side of the two side supporting frames.

A rear supporting frame 5 is with its both ends, separably in connection with the connection box 8 provided at the rear side of the two side supporting frames.

The two upper supporting frames 6 are respectively with their front and rear hinged joints 61, 62 in hinged connection with the connection boxes 9 provided at the front and the rear sides of the two side supporting frames 3, and a supporting frame main body 63 is respectively provided to each of the both sides of the two upper supporting frames 6 so as to be connectable with the hinged joints 61, 62.

Meanwhile, in the present embodiment the positioning devices 10, 20 for bonding the front bars 12 22 and the rear bars 13, 23 of the first and the second bottom frames 1, 2 may be elastic pins, or the like, and the front bars 12, 22 and the rear bars 13, 23 of the first and the second bottom frames 1, 2 are all made of hollow tubes (see FIG. 6-7), wherein the front and the rear bars, 22, 23 of the second bottom frame 2 respectively accommodate the positioning devices, such as the elastic pins 10, 20 and two ends 101, 201 (see FIGS. 2, 6, 7) of the positioning devices 10, 20, i.e. the elastic pins may penetrate through via holes 221, 231 (see FIGS. 6-7) formed at upper and lower portions of the front and the rear bars 22, 23 of the second bottom frame 2, and further through positioning holes 121, 131 formed at upper and lower portions of the front and the rear bars 12, 13 of the first bottom frame 1.

Besides, each of the connection boxes 8 provided at the front and the rear sides of aforesaid two supporting frames 3 upper bars 31 respectively has a detention slot 81 (see FIG. 3), and corresponding elastic hooks 41, 51 are respectively provided at the right and the left sides of aforesaid front and rear supporting frames 4, 5. By engaging the elastic hooks 41, 51 with their corresponding detention slots 81, the front and the rear supporting frames 4, 5 can be separably hooked onto the detention slots 81.

With this blind supporting frame work structure, a camouflaged cloth covered structure (not shown) can be built up by way of machine sewing, or binder hook bound. When in use, both upper supporting frames 6 can be conveniently turned about the hinged joint to separate each other for beginning duck hunting.

In short, it emerges from the description of the above embodiment that the invention has several noteworthy advantages, in particular:

1. Folding or developing operation is simple, convenient and rapid. When folding, the elastic hooks 41, 51 provided at two sides of the front and the rear supporting frames 4, 5 can be pressed to separate away from the connection boxes 8 (see FIG. 3) provided at the right and left sides of the supporting frames 3. Accordingly, the two side supporting frames 3 may turned towards the first and the second bottom frames 1, 2 to fold up (see FIG. 4), then by pressing the positioning devices 10, 20 i.e. elastic pins on their both terminals 101, 102 so as to release them from the positioning holes 122, 131 formed on the first bottom frame 1 and further may folded in the right and left directions of the first and the second bottom frames 1, 2 (see FIG. 5). In this manner, the material can be saved and operation is simplified. When developing, sequence of the operation can be carried out vice versa simply and easily without need for any hand tools.
2. The size of the folded structure is so compact to carry or change the hunting sites. Moreover, it is easy to put away or store. For the manufacturer, the cost of materials, packaging and transportation may be advantageously curtailed.
3. Owing to its simple structure, it is easy to assemble and lower the cost of man power and work time which lead to curtailing the production cost.

What is claimed is:

1. An easy fold layout hunting blind framework structure comprising:
    a first and a second bottom frames each having a side bar, and a front bar and a rear bar respectively connected to front and rear sides of said side bar, wherein said front bar and said rear bar of said first bottom frame are respectively coupled with the corresponding front bar and rear bar of said second bottom frame, and fixed by two positioning devices at their inner sides, the outer sides of said front bars and said rear bars of said first and said second bottom frames are respectively hinged to front and rear sides of a first and a second side supporting frames via a first shaft hinge and a second shaft hinge;
    said first and second side supporting frames each having an upper bar and a front and a rear standing bars connected to front and rear sides of said upper bar, wherein lower ends of said standing bars are respectively hinged to said first and said second bottom frames via said first and said second shaft hinges, a connection box is provided at said front and said rear sides of said upper bar of said two side supporting frames, a front and a rear shaft hinges are respectively provided at the front and rear sides of said upper bars of said two side supporting frames adjacent said connecting boxes,
    a front supporting frame being with its both right and left sides, separably in connection with said connection box provided at the front side of said two side supporting frames;
    a rear supporting frame being with its both right and left sides, separably in connection with said connection box provided at the rear side of said two side supporting frames; and
    two upper supporting frames being respectively with their front and rear hinged joints, in hinged connection with said front and rear shaft hinges provided at the front and the rear sides of said upper bar of each said two side supporting frames, and a supporting frame main body is respectively connected to said two upper supporting frames on each said first and second side supporting frames so as to be connectable with said hinged joint.

2. An easy fold layout hunting blind framework structure of claim 1, wherein said positioning devices for bonding said front bars and said rear bars of said first and said second bottom frames are elastic pins, and said front bars and said rear bars of said first and said second bottom frames are all made of hollow tubes, wherein said front and said rear bars of said second bottom frame respectively accommodate said elastic pins, and two ends of said elastic pins penetrate through via holes formed at upper and lower portions of said front and said rear bars of said second bottom frame, and further through positioning holes formed at upper and lower portions of said front and said rear bars of said first bottom frame.

3. An easy fold layout hunting blind framework structure of claim 1, wherein each of said connection boxes provided at the front and the rear sides of said two supporting frames' upper bars respectively has a detention slot, and corresponding elastic hooks are respectively provided at the right and the left sides of said front and said rear supporting frames, by engaging said elastic hooks with their corresponding detention slots, said front and said rear supporting frames are separably hooked onto said detention slots.

* * * * *